(12) United States Patent
Ripamonti et al.

(10) Patent No.: US 10,648,950 B2
(45) Date of Patent: May 12, 2020

(54) TURBINE BLADE WITH ULTRASONIC WAVE SCATTERING FEATURE

(71) Applicant: General Electric Technology Gmb, Baden (CH)

(72) Inventors: Luca Marie Ripamonti, Rieden (CH); Andreas Kaiser, Bad Saeckingen (CH); Christophe Udell, Ennetbaden (CH); Marcin Wielgat, Windisch (CH)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 15/756,802

(22) PCT Filed: Aug. 17, 2016

(86) PCT No.: PCT/EP2016/069501
§ 371 (c)(1),
(2) Date: Mar. 1, 2018

(87) PCT Pub. No.: WO2017/036797
PCT Pub. Date: Mar. 9, 2017

(65) Prior Publication Data
US 2018/0245473 A1    Aug. 30, 2018

(30) Foreign Application Priority Data
Sep. 2, 2015 (EP) .................................... 15183454

(51) Int. Cl.
*G01N 29/22* (2006.01)

(52) U.S. Cl.
CPC ....... *G01N 29/221* (2013.01); *F05D 2220/31* (2013.01); *F05D 2240/24* (2013.01);
(Continued)

(58) Field of Classification Search
CPC .... F01D 5/26; F05D 2220/31; F05D 2240/24; F05D 2240/80; F05D 2250/183;
(Continued)

(56) References Cited

U.S. PATENT DOCUMENTS

| 3,299,696 A | 1/1967 | Dickinson, III |
| 9,920,644 B2 * | 3/2018 | McKenna ............. F01D 11/005 |
| 2009/0165317 A1 | 7/2009 | Little |

FOREIGN PATENT DOCUMENTS

| DE | 102006005056 A1 | 8/2006 |
| GB | 836030 A | 6/1960 |

(Continued)

OTHER PUBLICATIONS

Extended European Search Report and Opinion issued in connection with corresponding EP Application No. 15183454.6 dated Mar. 8, 2016.
(Continued)

*Primary Examiner* — Richard A Edgar
(74) *Attorney, Agent, or Firm* — Charlotte C. Wilson; James W. Pemrick

(57) ABSTRACT

The invention relates to a turbine blade comprising a platform edge surface including an ultrasonic wave scattering feature comprising surface irregularities adapted to alter a reflection path of an ultrasonic pulse wave.

8 Claims, 2 Drawing Sheets

(52) U.S. Cl.
CPC .... *F05D 2240/80* (2013.01); *F05D 2250/183* (2013.01); *F05D 2260/83* (2013.01); *G01N 2291/0258* (2013.01); *G01N 2291/044* (2013.01); *G01N 2291/2693* (2013.01)

(58) Field of Classification Search
CPC .............. F05D 2260/83; G01N 29/043; G01N 29/221; G01N 2291/0258; G01N 2291/044; G01N 2291/2693
See application file for complete search history.

(56) References Cited

FOREIGN PATENT DOCUMENTS

| | | |
|---|---|---|
| JP | H10-239287 A | 9/1998 |
| SE | 151575 C1 | 9/1955 |

OTHER PUBLICATIONS

International Search Report and Written Opinion issued in connection with corresponding PCT Application No. PCT/EP2016/069501 dated Oct. 24, 2016.

International Preliminary Report on Patentability issued in connection with corresponding PCT Application No. PCT/EP2016/069501 dated Mar. 6, 2018.

* cited by examiner

US 10,648,950 B2

TURBINE BLADE WITH ULTRASONIC WAVE SCATTERING FEATURE

TECHNICAL FIELD

The present disclosure relates generally to non-destructive testing of turbine blade platforms for the presence of defects either during or after blade manufacture as part of operational maintenance or following blade repair/modification. The disclosure further relates to blade configurations adapted to improve defect detection using ultrasonic Non Destructive Testing test methods.

BACKGROUND INFORMATION

There are various mechanisms which may be responsible for the on-set of defects in blade roots, including high and low cycle fatigue. The presence of a defect may compromise the mechanical integrity of the blade, and as a result, it is important to have robust inspections methods to identify and quantify defects. This is commonly done by performing in-situ inspection by Non-Destructive Tests (NDT) methods that avoid disassembly of the blade row.

For a multi-stage steam turbine, due to the large number of scans required to obtain full coverage, in situ ultrasonic NDT inspections of last stage blades can last in the order of several days per turbine. One of the reasons for the length of time required is that echoes of the ultrasonic signals from the Phase Array probe from features of the foot platform interfere/hide signals from possible defects at relevant locations of the last stage blade. As a result, repeat scans are often performed. However, repeating a scan does not guarantee a previously hidden defect will be revealed as the assembled state of the blades significantly limits inspection angles and as a result is may not be possible, up until now, to avoid signal echoes from all blade features. If significant doubt remains, it may not be possible to avoid disassembly of the blade row and the use of another NDT technique, such as magnetic particle inspection, may be required.

SUMMARY

A root platform of a last stage steam turbine blade is provided that at least partially overcomes the problem of blade platform geometry masking ultrasound echoes of a defect that reduces the ability of the ultrasonic NDT method to reliably identify defects.

It attempts to address this problem by means of the subject matter of the independent claim. Advantageous embodiments are given in the dependent claims.

The invention is based on the general idea of providing surface features on relevant points of the blade platform that minimise ultrasound echo by scattering of the signal. In this way echo's derived from defects are not masked.

One general aspect includes a turbine blade comprising a root section, for engaging with a rotor, having a platform, with a top surface and an edge forming an outer boundary of the top surface. The edge has an edge surface while the turbine blade further includes an airfoil extending from the top surface. At least a portion of the edge surface includes an ultrasonic wave scattering feature comprising surface irregularities adapted to alter a reflection path of an ultrasonic pulse wave.

In a further aspect the ultrasonic wave scattering feature comprises a plurality of serrated teeth that are arranged to form a plurality of ridges each interspaced with a valley.

In a yet further aspect, at least one of the plurality of serrated teeth has a height perpendicular to edge surface between the ridge and the interspaced valleys around 0.5 mm in a range between 0.4 mm to 2.0 mm.

In another aspect, at least one of the plurality of serrated teeth has a pitch of 1 mm in the range between of 0.5 mm to 2.0 mm.

In another aspect, the ridges are aligned so as to extend across the edge surface.

In a yet further aspect, the turbine blade is configured as a multi-stage steam turbine blade, including a last stage steam turbine blade.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1A:
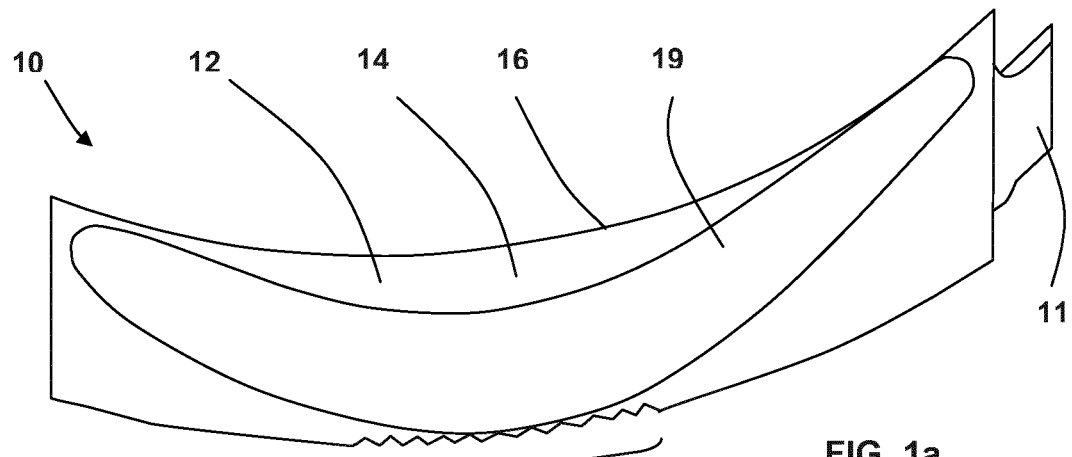
FIG. 1A is a top view of an exemplary blade comprising a ultrasonic wave scattering feature.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

An exemplary embodiment shown in FIG. 1A comprises a turbine blade 10 with a root section 11 for engaging with a rotor (not shown). In this context, engaging means that the root section 11 is configured to fixingly attach to a rotor. This may be by any known means including suitable root section 11 configurations that are adapted to retain the root section 11 in a rotor. Such configurations include a fir tree, T-root or a pin-root arrangement.

The root section 11 further includes a platform 12 having a top surface 14, and an edge 16 that forms an outer boundary of the top surface 14. That is, in the installed position in a rotor, the edge 16 defines the axial and circumferential limits of the platform 12. In the exemplary embodiment, the edge 16 includes an edge surface 17. Such an edge surface 17 is a surface that is generally orthogonal to the top surface 14 of the platform 12 and further circumscribes the platform 12.

As shown in FIG. 1A, at least a portion of the edge surface 17 comprises an ultrasonic wave scattering feature 20 adapted to alter a reflection path of an ultrasonic pulse wave. While it is recognised that standard features of root section 11 may be able to scatter ultrasonic waves to a limited degree, within this specification an ultrasonic wave scattering feature 20 differentiates itself from such as feature by having the sole function of ultrasonic wave scattering. For this reason, curves of a fir tree, which have the function of fixing the root section 11 into a rotor, edges 16 and edges surfaces 17 having the function of defining the shape of a platform 12 and further providing sealing and or mating services with rotor grooves and/or adjacently fitted turbine blades, and other such features that define the turbine blades structural, functional and fluidal performance are not ultrasonic wave scattering features 20.

Figure 1B:
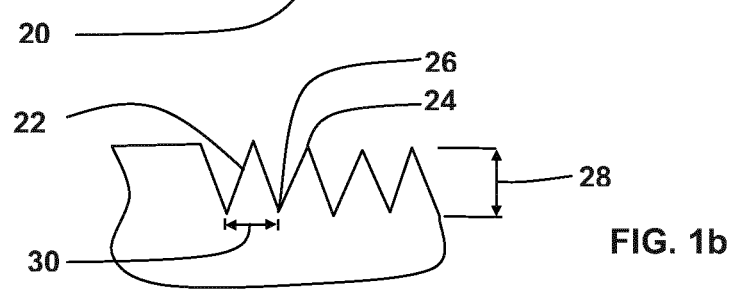
FIG. 1B is an expanded view of a portion of the ultrasonic wave scattering feature of FIG. 1A.

In an exemplary embodiment shown in FIG. 1A and in expanded view FIG. 1B, the ultrasonic wave scattering features 20 comprises a plurality of serrated teeth 22 arranged to form ridges 24 interspaced with valleys 26. In an exemplary embodiment, the ridges 24 are aligned so as to extend across the edge surface 17 thereby aligning ridges 24 and valleys 26 essentially perpendicular to the top surface 14. In an alternate not show exemplary embodiment, ridges 24 and valleys 26 are aligned along the edge surface so as to be essentially parallel to the top surface 14. In further exemplary embodiments, ridges 24 and valleys 26 are aligned between these two extremes. In a yet further exemplary embodiment, ridges 24 and valleys 26 are not linear but curved so may comprise characteristics of both extremes.

In an exemplary embodiment shown in FIG. 1B, at least some of the plurality of serrated teeth 22 has a height 28 perpendicular to the edge surface 17, as measured between a ridge 24 and an adjacent valley 26, in a range of 0.4 mm to 2.0 mm. In a further exemplary embodiment, the height 28 is of 0.5 mm. In this context, the direction of height 28 in the region of the ridge 24 is based on the plane the edge surface 17 would form free of surface imperfections and wave scattering features 20.

In an exemplary embodiment shown in FIG. 1B, at least one of the plurality of serrated teeth 22 has a pitch 30 in the range of 0.5 mm to 2.0 mm. In a further exemplary embodiment, at least one of the plurality of serrated teeth 22 has a pitch of 1 mm wherein pitch is defined as the distance, in the horizontal plane, between each ridge 24 and adjacent valley 26.

In an exemplary embodiment the turbine blade 10 is configured as a multi-stage steam turbine blade and may further be configured as a last stage steam turbine blade.

Figure 2:
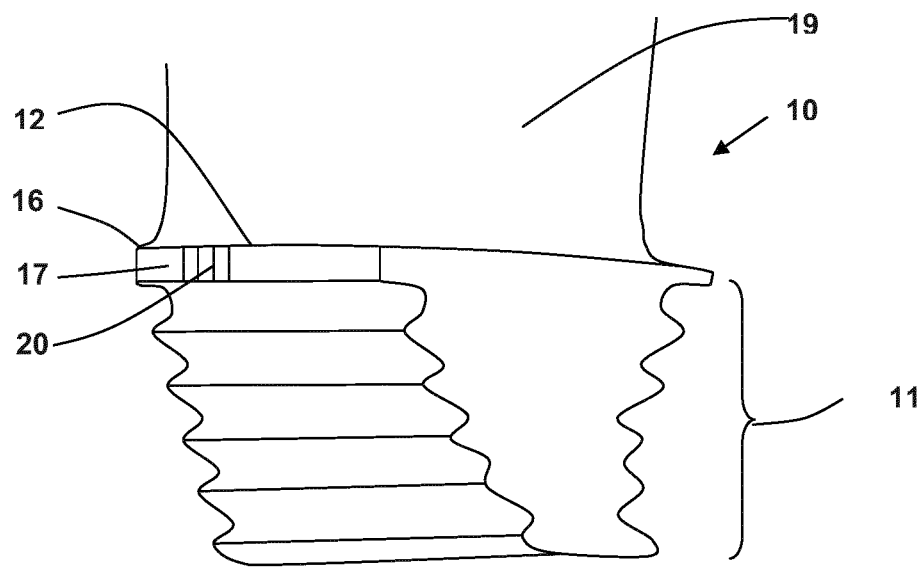
FIG. 2 is side view of the exemplary blade of FIG. 1A.

FIG. 2 shows an additional perspective view of the turbine blade of FIGS. 1A and 1B.

Figure 3A:
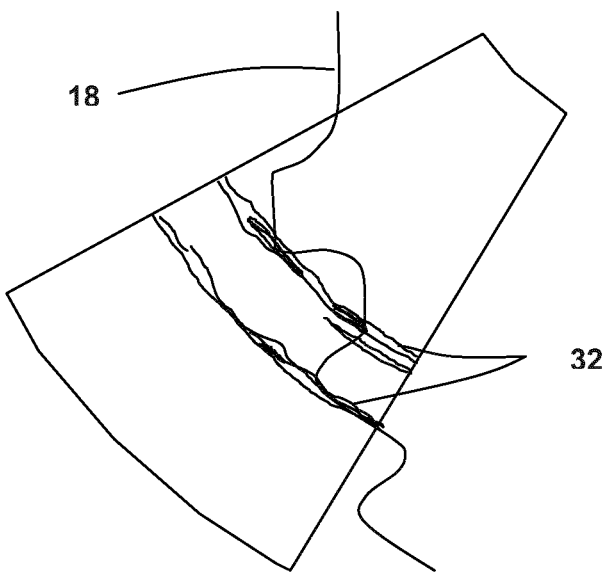
FIGS. 3A,B,C show the effect of an ultrasonic wave scattering feature on ultrasonic pulse reflection.

FIG. 3A,B,C show the effect of an ultrasonic wave scattering feature 20 on ultrasonic pulse echo 32 of standard blade root features shown against a root outline 18.

In the example provided in FIG. 3A, the root section 11 does not include any ultrasonic wave scattering features, and therefore can be considered the base case. As can be seen from FIG. 3A, a strong ultrasonic pulse echo 32 occurs in a region of the edge surface 17.

Figure 3B:
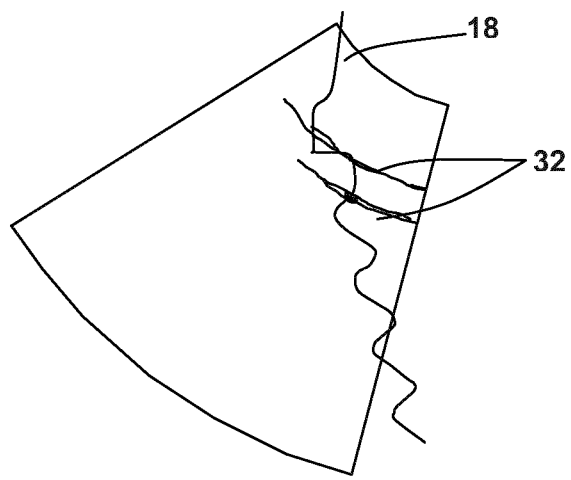

In the example shown in FIG. 3B, the edge surface 17 includes ultrasonic wave scattering features 20 shown in FIGS. 1A, B and FIG. 2, having a height of 0.5 mm. In comparison with FIG. 3A, the edge surface 17 shows significantly less measured ultrasonic pulse echo 32.

Figure 3C:
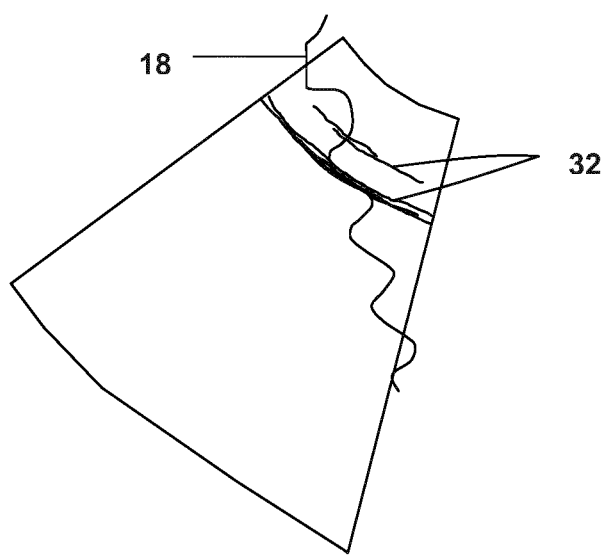

In the example shown in FIG. 3C, the height of the ultrasonic wave scattering feature 20 of FIG. 3B is increased to 2.0 mm. In comparison to FIG. 3B, the edge surface 17 shows a further reduction in ultrasonic pulse echo 32 to the point of almost no ultrasonic pulse echo 32. For the given example, it would be possible to include wave scattering features 20 having a height greater than 2.0 mm up to the point where the wave scattering features 20 affect the characteristics of the blade, for example by influencing inter blade platform sealing. The upper limit is, therefore, depending on blade configurationally constraints unrelated to testing limitations.

As a result of the reduced echo of standard blade features, defects in the region of the ultrasonic wave scattering feature 20 have less chance to be potentially hidden.

The optimum arrangement and configuration of the wave scattering features 20 is dependent on the configuration of the root section 11 in regard the location of curved and edged regions and their capability to reflect ultrasonic waves and as a result mask the reflection of defects. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A turbine blade comprising:
    a root section for engaging with a rotor;
    a platform having a bottom surface connected to the root section, a top surface distal to the root section, and an edge circumscribing the platform and comprising an edge surface orthogonal to the bottom surface and the top surface; and
    an airfoil extending from the top surface of the platform, the airfoil having a suction side and a pressure side;
    wherein a portion of the edge surface of the platform proximate to the suction side comprises a plurality of serrated teeth that are arranged to form a plurality of ridges, each ridge interspaced with a valley and extending perpendicularly to the top surface.

2. The turbine blade of claim 1, wherein at least one of the plurality of serrated teeth has a height perpendicular to the edge surface extending between a ridge of the plurality of ridges and an adjacent valley, the height being in a range of 0.4 mm to 2.0 mm.

3. The turbine blade of claim 1, wherein at least one of the plurality of serrated teeth has a height perpendicular to the edge surface extending between a ridge of the plurality of ridges and an adjacent valley, the height being 0.5 mm.

4. The turbine blade of claim 1, wherein a pitch is defined as a distance between a first valley and an adjacent second valley; and wherein the pitch of at least one of the plurality of serrated teeth is in a range of 0.5 mm to 2.0 mm.

5. The turbine blade of claim 1, wherein the pitch of at least one of the plurality of serrated teeth is 1 mm.

6. The turbine blade of claim 1, wherein the plurality of serrated teeth extends across the edge surface.

7. The turbine blade of claim 1, configured as a multi-stage steam turbine blade.

8. The turbine blade of claim 7, configured as a last stage steam turbine blade.

* * * * *